(12) United States Patent
Wanka et al.

(10) Patent No.: US 7,178,402 B2
(45) Date of Patent: Feb. 20, 2007

(54) PRESSURE MEASURING DEVICE FOR VACUUM SYSTEMS

(75) Inventors: Harald Wanka, Blaustein (DE); Johann Georg Reichart, Blaubeuren (DE); Hans-Peter Volkelk, Griesingen (DE)

(73) Assignee: Centrotherm Photovoltaics GmbH & Co. KG, Blaubeuren (DE)

( * ) Notice: Subject to any disclaimer, the term of this patent is extended or adjusted under 35 U.S.C. 154(b) by 0 days.

(21) Appl. No.: 11/115,891

(22) Filed: Apr. 27, 2005

(65) Prior Publication Data

US 2006/0137459 A1    Jun. 29, 2006

(30) Foreign Application Priority Data

Apr. 28, 2004  (DE) .................. 10 2004 020 915

(51) Int. Cl.
*G01L 9/12*     (2006.01)
(52) U.S. Cl. .................... 73/718; 73/715; 73/716; 73/753
(58) Field of Classification Search .......... 73/700–756; 361/283.1–283.4
See application file for complete search history.

(56) References Cited

U.S. PATENT DOCUMENTS

| | | | |
|---|---|---|---|
| 4,766,666 A * | 8/1988 | Sugiyama et al. ......... 29/621.1 |
| 5,032,026 A * | 7/1991 | Jouve et al. ................. 356/478 |
| 5,317,917 A * | 6/1994 | Dufour ........................ 73/702 |
| 5,335,550 A * | 8/1994 | Satou .......................... 73/727 |
| 5,949,118 A * | 9/1999 | Sakai et al. ................. 257/419 |
| 5,983,727 A * | 11/1999 | Wellman et al. ............. 73/724 |
| 6,688,181 B1 * | 2/2004 | Clerc et al. .................. 73/715 |
| 6,782,757 B2 * | 8/2004 | Clerc et al. .................. 73/754 |
| 6,928,879 B2 * | 8/2005 | Partridge et al. ............. 73/754 |

FOREIGN PATENT DOCUMENTS

DE    2015962       11/1971
DE    10018620 A1  10/2001

* cited by examiner

Primary Examiner—Edward Lefkowitz
Assistant Examiner—Jermaine Jenkins
(74) Attorney, Agent, or Firm—Baker Botts L.L.P.

(57) ABSTRACT

A pressure-measuring device is configured for use in vacuum systems, which are used for surface coating or modification of objects and/or substrates in an inner receptacle inside a processing chamber. Elastic elements or portions are fabricated in the inner receptacle. The pressure-measuring device includes distance-measuring elements designed to measure the deformation of the elastic elements of the inner receptacle. The deformation measurements are related to the pressure in the inner receptacle. The pressure-measuring device provides a continuous and secure determination of the pressure.

6 Claims, 1 Drawing Sheet

P2 > P1

P2 = P1

P2 < P1

PRESSURE MEASURING DEVICE FOR VACUUM SYSTEMS

CROSS REFERENCE TO RELATED APPLICATIONS

This application claims the benefit of German Patent Application No. 10 2004 020 915.4-52 filed Apr. 28, 2004, which application is hereby incorporated by reference in its entirety herein.

FIELD OF THE INVENTION

The invention relates to a pressure-measuring device for vacuum systems. In particular, this invention relates to pressure-measuring devices for vacuum systems that are used as processing or reaction chambers for surface coating or surface modification of objects and/or substrate.

BACKGROUND OF THE INVENTION

Ordinarily, coating or vapor deposition reactors are employed as a processing chamber, for example, in semiconductor technology, for coating wafers or other semiconductor structures and other substrates. The substrates, e.g., wafers may be placed in an inner receptacle, and a suitable pressure for the process to follow is produced by a vacuum pump connected to the processing chamber. The inner receptacle surrounds a reaction space.

As soon as, after introduction of the materials or substrates to be processed, the requisite pressure required in each instance for the particular coating or vapor deposition process has been reached in the inner receptacle, the process in question is started.

After processing of the substrates in the inner receptacle, the normal ambient pressure is established in the latter, so that it may be opened and the processed substrate removed.

In the processes described, which are carried out in vacuum systems having so-called inner receptacles in which the actual material or substrate to be processed is located, process control represents a considerable problem.

The inner receptacles are, for example, required if the reactor chamber must be protected from the actual reaction in the reaction space in the inner receptacle, or vice versa. If the separation also requires a 'gas-technical' shielding, necessarily different pressure conditions will establish themselves. In such a case, a pressure measurement and hence a targeted process control, for example, by the action of temperature, is not possible. The reason for this lies in that the installation of a pressure measuring tube in the inner receptacle is generally not possible because of an undesirable interaction between the process and conventional pressure pick-ups, or if the inner receptacle must be transported together with the substrates inside the processing chamber.

Consideration is now being given to the design and configuration of pressure measuring device for vacuum systems that are used for the surface coating or modification of objects and/or substrates. Attention is in particular, to the measurement of pressure in vacuum systems in which processing of substrates in conducted in an inner receptacle, which defines a reaction space, inside an outer processing chamber. Desirable pressure measurement devices, will provide a continuous and secure determination of the pressure in the internal receptacle and/or the pressure difference between the inner receptacle and the outer processing chamber.

SUMMARY OF THE INVENTION

Pressure measurement devices and methods are provided for applications in vacuum systems that process substrates in a defined inner reaction space in an outer processing chamber. The inner reaction space is defined by an inner receptacle structure. At least a portion of the structure is an element having a suitably defined elasticity. This elastic portion of the inner receptacle is associated with a measuring means for measuring the deformation of the portion. The measurement of the deformation of the elastic portion may preferably take place by distance measurement using, for example, a laser.

A simple modification of the deformation measurement consists in that the motion or deformation of the elastic portion may be measured with some other conventional method, as, for example, a tester or a capacitive or inductive sensor. If different pressure conditions are established in the reaction chamber (i.e. the inner receptacle) and the outer vacuum chamber, the pressure difference between outer and inner chambers can be calculated exactly from the deformation. In the outer chamber, the pressure can be determined by another pressure measuring means (e.g. a conventional pressure gauge or pressure measuring tube), and therefore the pressure in the inner receptacle, not previously accessible, can be known as well.

Further features of the invention, its nature and various advantages will be more apparent from the accompanying drawing and the following detailed description.

BRIEF DESCRIPTION OF THE DRAWINGS

In the drawings throughout which like reference numbers refer to like elements.

The following is an index of the reference numerals and corresponding elements identified in the Figs.

Figure 1:
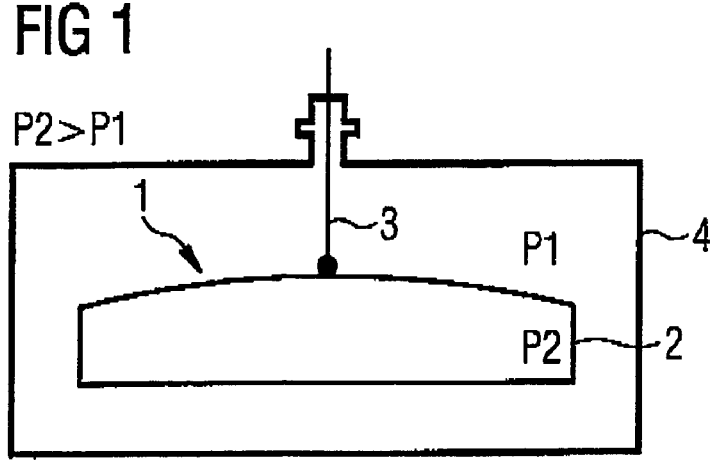
FIG. 1 is a schematic representation of an inner receptacle in a vacuum system processing chamber, with elevated internal pressure relative to the processing chamber, in accordance with the principles of the present invention.

INDEX OF REFERENCE NUMERALS 1 elastic portion
2 inner receptacle
3 distance measuring means
4 processing chamber

DESCRIPTION OF THE INVENTION

The present invention provides pressure measurement devices and methods for applications in vacuum systems that are used to process substrates in a defined inner reaction space within an outer processing chamber. The inner reaction space is defined by an inner receptacle structure. At least a portion of the structure is fabricated from an element having a defined elasticity. The deformation of the elastic element is related to the pressure in the inner receptacle or the pressure difference between the inner receptacle and the outer processing chamber. The deformation of the elastic portion is measured by suitable electrical, mechanical, optical or other techniques. The measured deformation provides a measure of the pressure in the inner receptacle.

Figure 2:
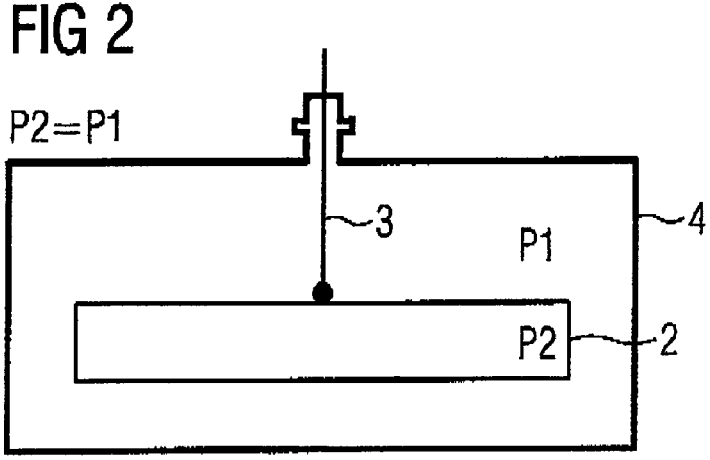
FIG. 2 is a schematic representation of the inner receptacle of FIG. 1 upon pressure equalization, in accordance with the principles of the present invention.
Figure 3:
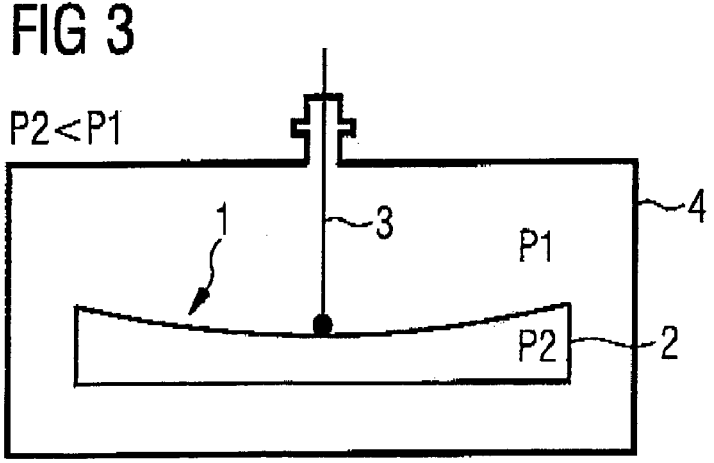
FIG. 3 is a schematic representation of the inner receptacle of FIG. 1 with lower internal pressure compared to the processing chamber, in accordance with the principles of the present invention.

With reference to the FIGS. 1–3, if different pressure conditions are established in inner receptacle 2 and processing chamber 4 surrounding it, and if inner receptacle 2 has an elastic portion 1, then the pressure difference between processing chamber 4 and inner receptacle 2 can be determined exactly from the deformation of elastic portion 1.

In processing chamber 4, the actual pressure may be determined by commercial pressure measuring means, and therefore the internal pressure, not directly measurable in inner receptacle 2, is also known.

The measurement of deformation of elastic portion 1 is accomplished with the aid of a distance measuring means 3 having a laser or else a mechanical probe and/or a capacitive or inductive sensor.

It will be understood that the foregoing is only illustrative of the principles of the invention, and that various modifications can be made by those skilled in the art, without departing from the scope and spirit of the invention

The invention claimed is:

1. A pressure-measuring device for vacuum systems in which an inner receptacle is disposed in an outer processing chamber, the inner receptacle defining a reaction space for processing substrates, the pressure-measuring device comprising:

an elastic element which is at least a portion of the inner receptacle defining a reaction space for processing substrates inside the outer processing chamber, the elastic element having a defined elasticity; and a deformation-measurement element associated with the elastic element, and configured to measure a distance, whereby the elastic portion's deformation distance, which is related to a pressure in the inner receptacle for processing substrates, is measured.

2. The pressure-measuring device of claim 1, wherein the deformation-measurement element comprises a laser.

3. The pressure-measuring device of claim 1, wherein the deformation-measurement element comprises a mechanical probe.

4. The pressure-measuring device of claim 1, wherein the deformation-measurement element comprises at least one of a capacitive sensor and an inductive sensor.

5. The pressure-measuring device of claim 1, that is configured to determine a pressure difference from a measured deformation of the elastic portion when the inner receptacle and the outer processing chamber are at different pressures.

6. The pressure-measuring device of claim 1, further comprising a pressure gauge for measurement of the pressure in the outer processing chamber.

* * * * *